(12) United States Patent
Lee et al.

(10) Patent No.: US 11,907,814 B2
(45) Date of Patent: *Feb. 20, 2024

(54) DATA PATH FOR GPU MACHINE LEARNING TRAINING WITH KEY VALUE SSD

(71) Applicant: Samsung Electronics Co., Ltd., Suwon-si (KR)

(72) Inventors: Joo Hwan Lee, San Jose, CA (US); Yang Seok Ki, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/533,059

(22) Filed: Nov. 22, 2021

(65) Prior Publication Data

US 2022/0164708 A1    May 26, 2022

Related U.S. Application Data

(63) Continuation of application No. 15/942,218, filed on Mar. 30, 2018, now Pat. No. 11,182,694.

(Continued)

(51) Int. Cl.
*G06F 13/10* (2006.01)
*G06F 12/10* (2016.01)
(Continued)

(52) U.S. Cl.
CPC .......... *G06N 20/00* (2019.01); *G06F 12/1081* (2013.01); *G06F 13/102* (2013.01); *G06F 2212/621* (2013.01)

(58) Field of Classification Search
CPC ............... G06F 13/1081; G06F 13/102; G06F 2212/321; G06N 20/00
(Continued)

(56) References Cited

U.S. PATENT DOCUMENTS 6,009,148 A    12/1999 Reeves
8,095,694 B2    1/2012 Rostaing et al.
(Continued)

FOREIGN PATENT DOCUMENTS

JP    2017-76398 A    4/2017
TW    201714076 A    4/2017
(Continued)

OTHER PUBLICATIONS

Wu, Chin-Hsien et al.; An Efficient B-Tree Layer for Flash-Memory Storage Systems, Department of Computer Science and Information Engineering, National Taiwan University, Taipei, Taiwan, 2003, 20 pages.

*Primary Examiner* — Christopher B Shin
(74) *Attorney, Agent, or Firm* — Lewis Roca Rothgerber Christie LLP

(57) ABSTRACT

A system and method for machine learning. The system includes a GPU with a GPU memory, and a key value storage device connected to the GPU memory. The method includes, writing, by the GPU, a key value request to a key value request queue in a input-output region of the GPU memory, the key value request including a key. The method further includes reading, by the key value storage device, the key value request from the key value request queue, and writing, by the key value storage device, in response to the key value request, a value to the input-output region of the GPU memory, the value corresponding to the key of the key value request.

20 Claims, 5 Drawing Sheets

Related U.S. Application Data

(60) Provisional application No. 62/625,532, filed on Feb. 2, 2018.

(51) Int. Cl.
*G06N 20/00* (2019.01)
*G06F 12/1081* (2016.01)

(58) Field of Classification Search
USPC .......................................................... 706/12
See application file for complete search history.

(56) References Cited

U.S. PATENT DOCUMENTS

| | | | |
|---|---|---|---|
| 8,996,781 B2 | 3/2015 | Schuette et al. | |
| 9,336,217 B2 | 5/2016 | Kruglick | |
| 9,927,984 B2 | 3/2018 | Qiu et al. | |
| 10,127,270 B1* | 11/2018 | Evenson | G06F 16/2379 |
| 10,204,046 B1 | 2/2019 | Peer | |
| 10,515,566 B2 | 12/2019 | Moon | |
| 2012/0310370 A1 | 12/2012 | Huang et al. | |
| 2013/0042060 A1 | 2/2013 | Marukame et al. | |
| 2013/0212088 A1* | 8/2013 | Park | G06F 16/24 707/722 |
| 2013/0271380 A1 | 10/2013 | Kim | |
| 2013/0275391 A1* | 10/2013 | Batwara | G06F 16/125 707/689 |
| 2013/0275656 A1* | 10/2013 | Talagala | G06F 12/0246 711/103 |
| 2015/0302111 A1 | 10/2015 | Yue et al. | |
| 2015/0324118 A1 | 11/2015 | Mccambridge et al. | |
| 2016/0034809 A1 | 2/2016 | Trenholm et al. | |
| 2016/0099810 A1 | 4/2016 | Li et al. | |
| 2016/0267016 A1 | 9/2016 | Lee et al. | |
| 2016/0283156 A1 | 9/2016 | Kufeldt et al. | |
| 2016/0379686 A1 | 12/2016 | Burger et al. | |
| 2017/0039269 A1 | 2/2017 | Raff et al. | |
| 2017/0147233 A1 | 5/2017 | De | |
| 2017/0148431 A1 | 5/2017 | Catanzaro et al. | |
| 2017/0169358 A1 | 6/2017 | Choi et al. | |
| 2017/0235671 A1 | 8/2017 | Jung | |
| 2017/0242867 A1 | 8/2017 | Sinha et al. | |
| 2017/0277438 A1 | 9/2017 | Gole et al. | |
| 2017/0286284 A1 | 10/2017 | Resinger et al. | |
| 2017/0300407 A1 | 10/2017 | Qiu et al. | |
| 2018/0357234 A1 | 12/2018 | De | |
| 2019/0244096 A1 | 8/2019 | Lee et al. | |
| 2019/0258587 A1* | 8/2019 | Zhou | G06F 3/061 |

FOREIGN PATENT DOCUMENTS

| | | |
|---|---|---|
| WO | WO 2011/153041 A2 | 12/2011 |
| WO | WO 2017/003831 A1 | 1/2017 |

* cited by examiner

DATA PATH FOR GPU MACHINE LEARNING TRAINING WITH KEY VALUE SSD

CROSS-REFERENCE TO RELATED APPLICATION(S)

This application is a continuation of U.S. patent application Ser. No. 15/942,218, filed Mar. 30, 2018, which claims priority to and the benefit of U.S. Provisional Application No. 62/625,532, filed Feb. 2, 2018, entitled "DATA PATH OPTIMIZATION FOR GPU MACHINE LEARNING TRAINING WITH KEY VALUE SSD", the entire contents of all of which are incorporated herein by reference.

FIELD

One or more aspects of embodiments according to the present disclosure relate to machine learning, and more particularly to a system and method for avoiding serialized key value access in a machine learning system.

BACKGROUND

In some related art solid state drives (SSDs) with a block interface, key value access to the data stored in the SSD requires involving the central processing unit (CPU) to provide a key value interface during stochastic machine learning training that randomly samples the subset of entire training data. The host CPU performs file index lookup and file system access to identify the location of the data, which leads to serialized key value access. Such serialized key value access may limit performance.

Thus, there is a need for an improved system and method for performing machine learning involving key value access to data.

SUMMARY

According to an embodiment of the present invention there is provided a method for machine learning, the method including: writing, by a first graphics processing unit, a first key value request to a key value request queue in a first input-output region of a first memory connected to the first graphics processing unit, the first key value request including a key; reading, by a first key value storage device connected to the first memory, the first key value request from the key value request queue, and writing, by the first key value storage device, in response to the first key value request, a first value to the first input-output region of the first memory, the first value corresponding to the key of the first key value request.

In one embodiment, the method includes, performing, by the first key value storage device, a key lookup, in the first key value storage device, to retrieve the first value.

In one embodiment, the first key value request includes a return-value region, the return-value region being a region allocated for the first value.

In one embodiment, the writing of the first value to the first input-output region of the first memory includes writing the first value to the return-value region.

In one embodiment, the writing of the first value to the first input-output region of the first memory includes writing the first value to a return-value queue in the first input-output region of the first memory.

In one embodiment, the method includes configuring, by a host connected to the first key value storage device and to the first graphics processing unit: the first key value storage device to access the first input-output region of the first memory to receive key value requests and to write values in response to the key value requests; and the first graphics processing unit to store key value requests in the first input-output region of the first memory and to read values from the first input-output region of the first memory.

In one embodiment, the method includes, writing, by a second graphics processing unit connected to the host, a second key value request to a key value request queue in an input-output region of a second memory connected to the second graphics processing unit, the second key value request including a key; reading, by a second key value storage device connected to the host and to the second memory, the second key value request from the key value request queue, and writing, by the second key value storage device, in response to the second key value request, a second value to the input-output region of the second memory, the second value corresponding to the key of the second key value request.

In one embodiment, the method includes: performing, by the first key value storage device, a key lookup, in the first key value storage device, to retrieve the first value, and performing, concurrently with the performing of the key lookup by the first key value storage device, a key lookup, by the second key value storage device, in the second key value storage device, to retrieve the second value.

In one embodiment, the reading, by the first key value storage device of the first key value request includes reading the first key value request via peer-to-peer direct memory access.

In one embodiment, the writing, by the first key value storage device, of the first value, includes writing the first value via peer-to-peer direct memory access.

In one embodiment, the first key value storage device is connected to the first graphics processing unit by a peripheral component interconnect connection.

In one embodiment, the method includes writing, by the first graphics processing unit, a second key value request to the key value request queue, after the writing, by the first graphics processing unit, of the first key value request and before the writing, by the writing, by the first key value storage device, of the first value.

In one embodiment, the method includes: writing, by the first graphics processing unit, a second key value request to a key value request queue in a second input-output region of the first memory, the second key value request including a key; reading, by a second key value storage device connected to the first memory, the second key value request from the key value request queue of the second input-output region of the first memory, and writing, by the second key value storage device, in response to the second key value request, a second value to the second input-output region of the first memory, the second value corresponding to the key of the second key value request.

In one embodiment, the method includes: performing, by the first key value storage device, a key lookup, in the first key value storage device, to retrieve the first value, and performing, concurrently with the performing of the key lookup by the first key value storage device, a key lookup, by the second key value storage device, in the second key value storage device, to retrieve the second value.

According to an embodiment of the present invention there is provided a system for machine learning, the system including: a graphics processing unit; a memory connected to the graphics processing unit; and a key value storage device; the key value storage device being connected to the graphics processing unit by a peripheral component interconnect connection; the graphics processing unit being configured to perform memory-mapped input and output operations in an input-output region of the memory, and to write one or more key value requests to a key value request queue within the input-output region; the key value storage device being configured to: perform memory-mapped input and output operations in the input-output region; read the one or more key value requests from the key value request queue; and in response to a key value request of the one or more key value requests, write a value in the input-output region of the memory, the value corresponding to a key of the key value request.

In one embodiment, the key value request includes a return-value region, the return-value region being a region allocated for the value.

In one embodiment, writing of the value to the input-output region of the memory includes writing the value to the return-value region.

In one embodiment, the writing of the value to the input-output region of the memory includes writing the value to a return-value queue in the input-output region of the memory.

According to an embodiment of the present invention there is provided a system for machine learning, the system including: a graphics processing unit; a key value storage device; and shared memory means for communication between the graphics processing unit and the key value storage device; the graphics processing unit being configured send one or more key value requests to the key value storage device via the shared memory means for communication, the key value storage device being configured to: receive the one or more key value requests; and in response to a key value request of the one or more key value requests, send a value to the graphics processing unit via the shared memory means for communication, the value corresponding to a key of the key value request.

In one embodiment, the shared memory means for communication includes a memory connected to the graphics processing unit, and configured to be accessed by the key value storage device via peer-to-peer direct memory access through a peripheral component interconnect connection.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for performing machine learning involving key value access to data provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Related art machine learning platforms have shortcomings when used in a stochastic machine learning training method that randomly samples a subset of entire training data. Such machine learning platforms may suffer from low graphics processing unit (GPU) utilization due to key value access during stochastic machine learning training, because it requires involving the CPU to provide key value interface and data transfer traversing the PCIe bus. As mentioned above, in some related art systems, the host CPU performs file index lookup and file system access to identify the location of the data, which leads to serialized key value access. By contrast, in some embodiments, performance is improved as a result of the CPU not being involved in key value access to the data stored in an onboard SSD. The GPU directly sends key value commands to an onboard key value storage device (e.g., an onboard key value SSD), e.g., on a graphics card that includes the GPU and the onboard key value SSD, which enables asynchronous key value access to reduce the effect of the access latency. As used herein, a "key value storage device" is a persistent storage device (such as an SSD) that is configured to respond to key value requests (each containing a key) by returning a value in response to each such request, the value corresponding to the key contained in the request.

Figure 1:
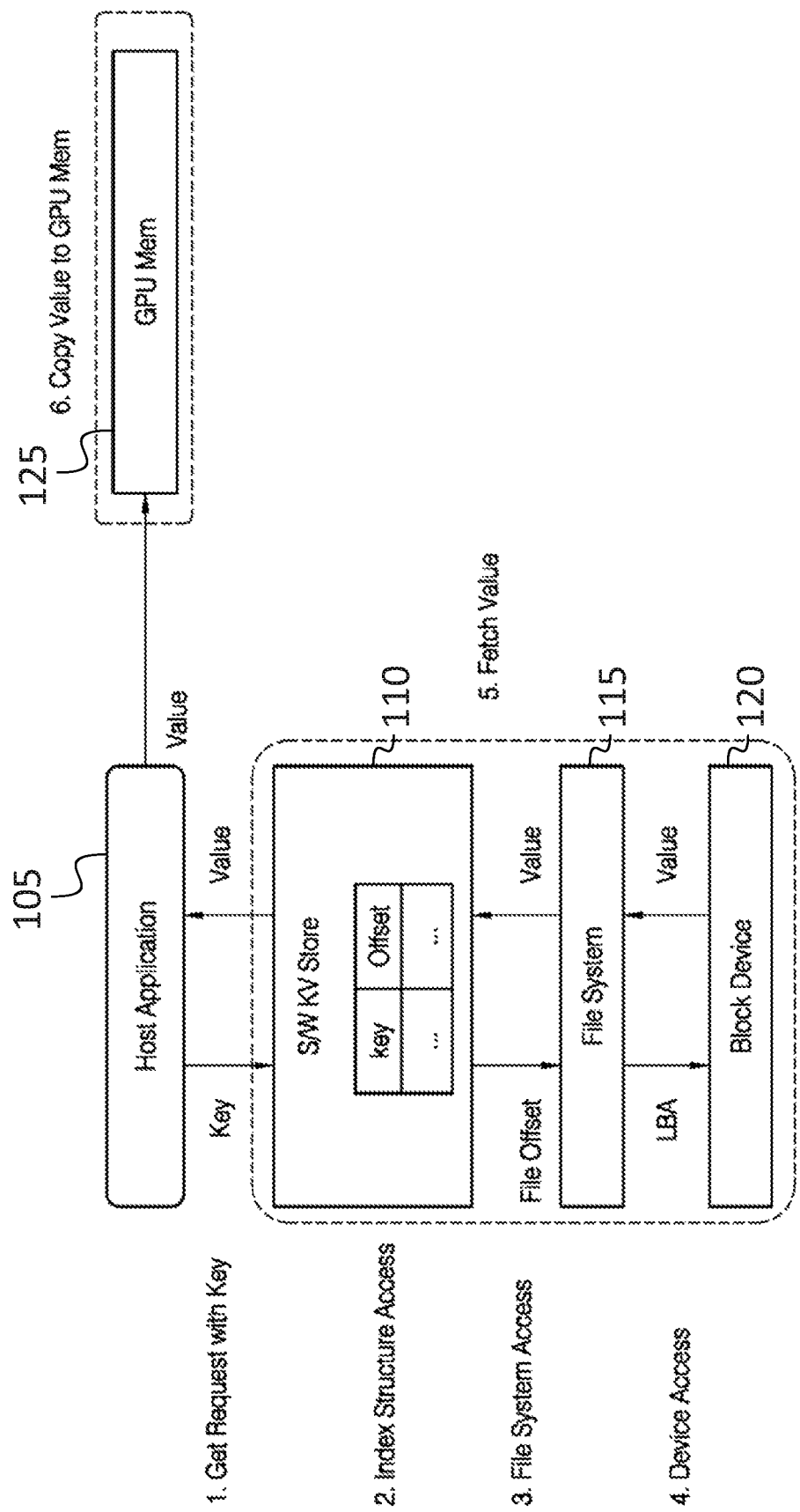
FIG. 1 is a functional block diagram of a system for machine learning.

FIG. 1 shows the overall flow of key value access to the data stored on an SSD with a block interface, using a software key value store, during GPU machine learning training. First, the host application 105 initiates a key value access by sending a "get" request to the software key value store 110. To identify the location of data for a certain key, the software key value store 110 accesses the index table that stores the file offset of the data corresponding to the specified key. Then the software key value store accesses the file system 115 with the file offset, and the file system 115 accesses the SSD with the block interface 120 and fetches the data corresponding to the specified key. Once the value becomes available to the host application, the host application transfers the value to GPU memory 125 for GPU computation and launches the GPU kernel. For a software key value store with a related art SSD with block interface, all these operations are performed sequentially.

As illustrated in FIG. 1, key value access to an SSD with block interface involves several computation steps running on the host to identify the location of the data corresponding to the specified key. The GPU is able to perform a corresponding computation only after the computations of the software key value store are finished. The latency of key value access increases when more GPUs are used in a system since GPUs need to wait for the completion of key value accesses from other GPUs, leading to serialization of GPU computations. As a result, key value access to related art SSDs with block interface limits the number of GPUs that may be productively used in a system.

Figure 2:
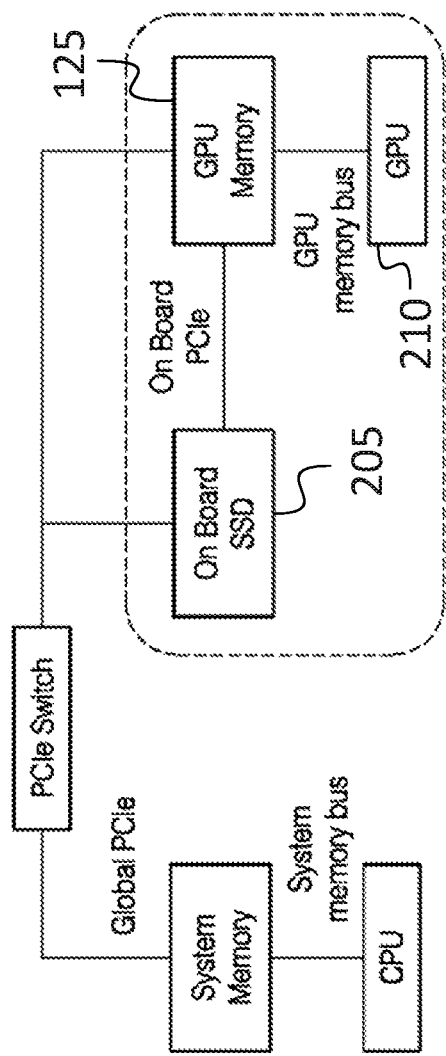
FIG. 2 is a block diagram of a graphics card equipped with an onboard SSD, according to an embodiment of the present disclosure.

In some embodiments a graphics card with onboard SSD with key value interface (or "key value SSD") is used to overcome some of the shortcomings of related art systems. FIG. 2 shows an exemplary system with such a device. Unlike a related art system in which moving data between storage and the GPU requires data transfer across a global PCIe bus, increasing the latency of data accesses from the GPU, a graphics card with an onboard key value SSD 205 may reduce the overhead by utilizing peer to peer (P2P) direct memory access (DMA) between the onboard key value SSD and the GPU 210 and gives the GPU 210 complete P2P DMA control. In some embodiments, the onboard key value SSD 205 provides key value commands as non-standard commands. For example, a key value request queue (discussed in further detail below) may be implemented as a nonvolatile memory express (NVMe) command queue, in which the NVMe commands are vendor-specific commands defined, in the firmware of the SSD 205 and in the driver software on the GPU, to correspond to key value commands, i.e., to commands that are used to request, from the SSD 205, a value corresponding to a key furnished as part of the command.

Figure 3:
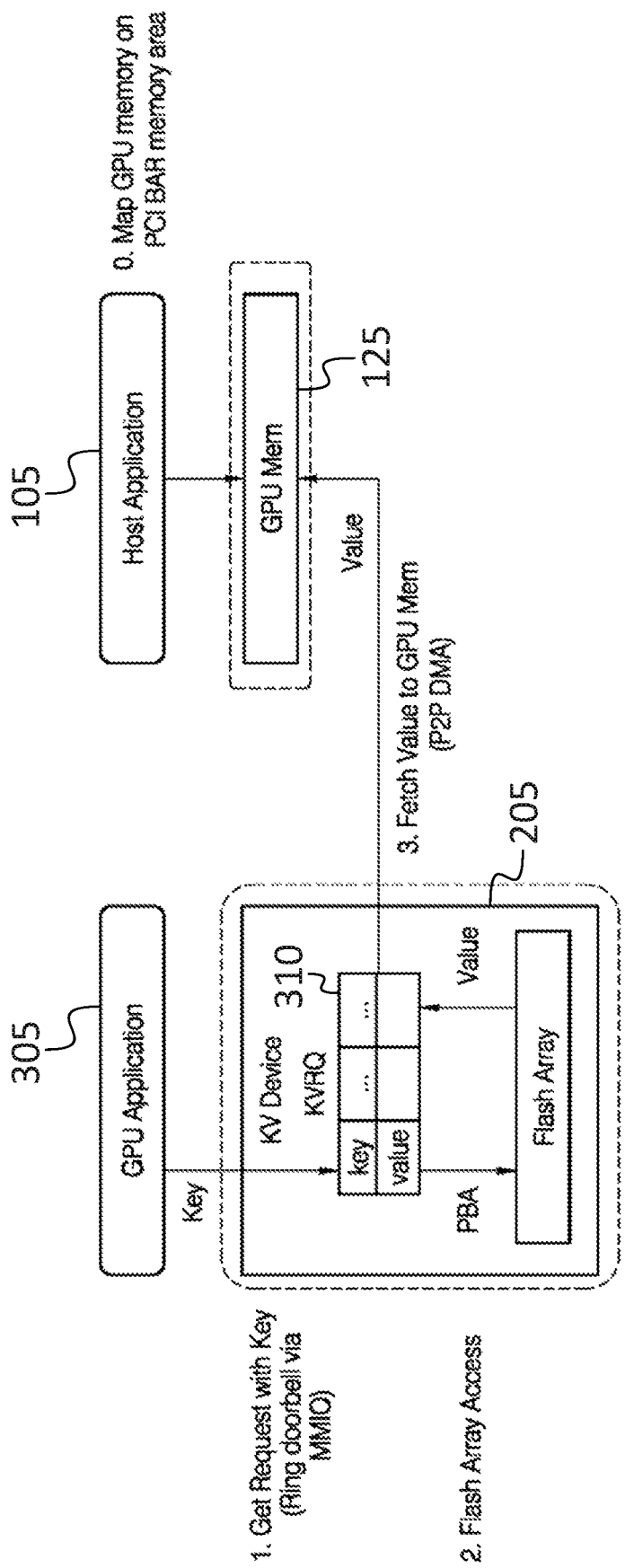
FIG. 3 is a data flow diagram, according to an embodiment of the present disclosure.

In some embodiments such a system may be used to provide asynchronous key value access in the onboard key value SSD, and some embodiments utilize a key value SSD within a graphics card for random sampling of training data. FIG. 3 shows the flow of key value access during machine learning training, in some embodiments. A significant difference between such an embodiment and some related art systems is that in such an embodiment the GPU sends key value commands directly to the key value SSD 205. First, during the initial stage of the execution of the host application, the host application maps the memory of a particular GPU device on peripheral component interconnect (PCI) base address registers (BAR) memory area to establish direct communication between the key value SSD 205 and the GPU. The region of GPU memory allocated, by this process, to communication (e.g., by memory-mapped input output) between the key value SSD 205 and the GPU may be referred to herein as the "input-output region" of the GPU memory. The input-output region of the GPU memory, being directly accessible by both the GPU and the key value SSD 205, may operate functionally as a shared memory. The GPU application 305 issues a get request to the key value SSD 205 by performing memory mapped IO on the key value SSD 205 and supplying the bus address of the exposed GPU memory. After firmware within the key value SSD 205 performs a key lookup to retrieve the value corresponding to the key, it writes the value to the mapped GPU device memory (i.e., to the input-output region of the GPU memory) without intermediation of the host application.

In some embodiments, a key value request queue (KVRQ) 305 is used, and the key value access is non-blocking, in the sense that the GPU need not wait for a response to a first request before making a second, subsequent request. Instead, the GPU places key value requests into the key value request queue 305, and the requests are processed in turn by the key value SSD 205. As such, the request operation is completed when the GPU application puts the request into the key value request queue 305. The key value request queue 305 holds uncompleted requests, so that the number of entries within key value request queue 305 is the number of key value requests. The firmware within the SSD 205 releases the key value request queue entry corresponding to the specified key when the value is transferred to GPU memory.

Figure 4:
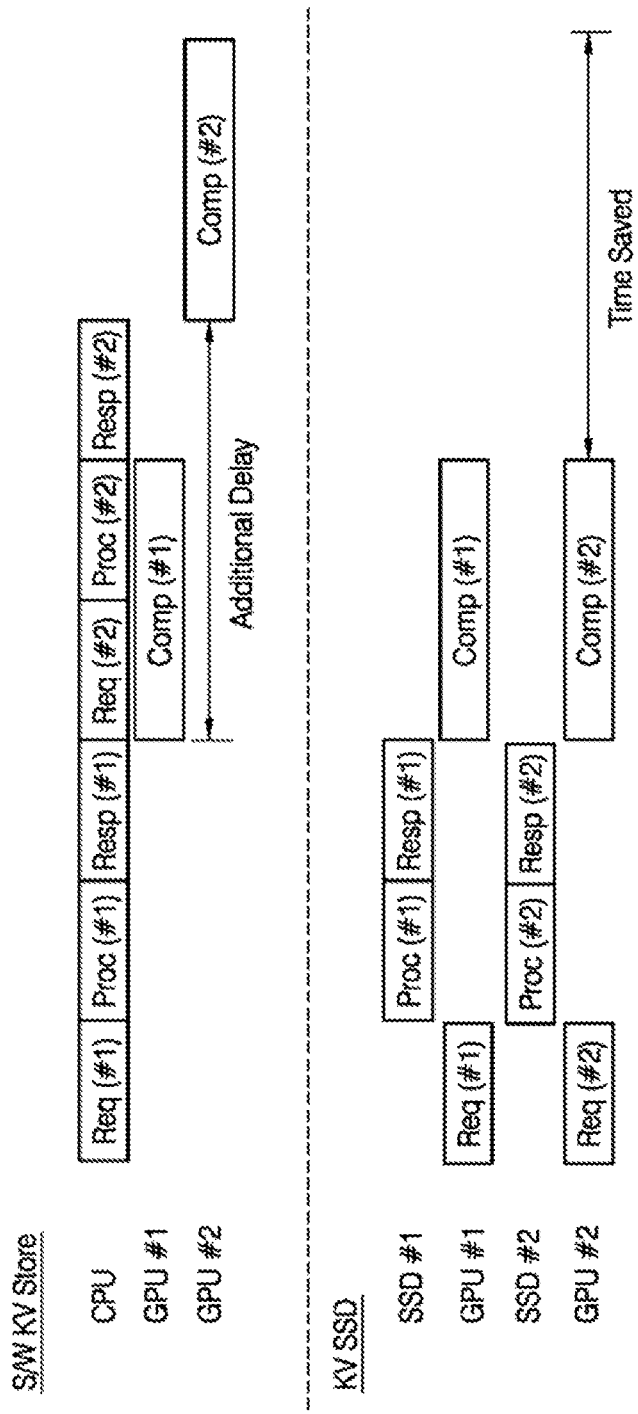
FIG. 4 is a timing diagram, according to an embodiment of the present disclosure.

Separate key value access for each GPU enables overlapping key value access from multiple GPUs. For example, in a system with two GPUs, each connected to a respective key value SSD, the two GPUs may issue requests concurrently, and their respective key value SSDs may respond concurrently. FIG. 4 illustrates the operation of such an example, involving two GPUs, each connected to a respective key value SSD. FIG. 4 also illustrates the time saved with a system, in such an embodiment, in which overlapping key value accesses are performed with two GPUs, compared to the related art approach in which the GPU computation is serialized. In some embodiments, three or more (e.g., an arbitrary number) of GPUs may each be connected to a respective key value SSD and perform overlapping (e.g., concurrent) key value operations.

Figure 5:
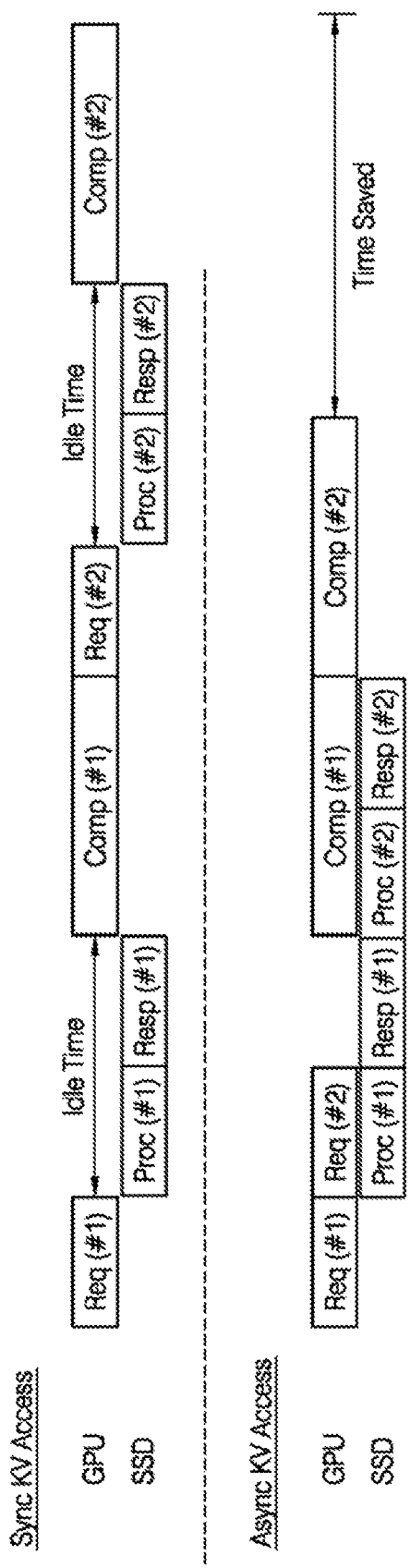
FIG. 5 is a timing diagram, according to an embodiment of the present disclosure.

In some embodiments, separation of request and response for key value access enables asynchronous key value access, e.g., enabling batching of multiple requests from a GPU. FIG. 5 illustrates an example of asynchronous key value accesses when batching two key value commands. Compared to synchronous key value access in which the GPU computation and SSD device access is serialized, the asynchronous key value access of some embodiments makes possible the overlapping of multiple key value commands with the GPU computation. In this example, the GPU continuously issues get requests instead of waiting, each time, for the completion of a previous request. In some embodiments, three or more (e.g., an arbitrary number) of GPUs may each be connected to a respective key value SSD and perform overlapping (e.g., concurrent) key value operations.

In some embodiments, when the key value SSD retrieves a value in response to a key value request, it writes the retrieved value back to the key value request queue, i.e., to a region (or "return-value region") of memory allocated within the key value request for this purpose. In other embodiments the key value SSD instead writes the retrieved value to a separate queue, (or "return value queue") allocated in the input-output region of GPU memory. In some embodiments, instead of each GPU having a single dedicated key value SSD to which it sends key-value requests, a single GPU may have several key value SSDs. In such an embodiment several key value request queues may be allocated in the GPU memory, each for a respective key value SSD. In other embodiments, several GPUs may be connected to a single key value SSD, which may, for example, service key value requests, in respective key value request queues in the GPUs, in a round-robin manner.

In some embodiments, the task performed by the host application only involves establishing the path for communication between GPU and SSD, which improves the scalability of these embodiments by avoiding the serialization of GPU computation that otherwise may result from key value access operations performed by the host application on the CPU. As such, these embodiments may enable scaling out multiple GPUs to accelerate machine learning training. By replacing complex key value software with a simple device interface, some embodiments also reduce the resource requirements that otherwise may be imposed on the host, including, e.g., a requirement on the number of CPU cores. Avoiding such a requirement may result in better energy efficiency.

Some embodiments may be constructed using one or more processing circuits. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of a system and method for performing machine learning involving key value access to data have been specifically described and illustrated herein, many modifications and variations will be apparent to those skilled in the art. Accordingly, it is to be understood that a system and method for performing machine learning involving key value access to data constructed according to principles of this disclosure may be embodied other than as specifically described herein. The invention is also defined in the following claims, and equivalents thereof.

What is claimed is:

1. A method for key value access in a machine learning system, the method comprising:
    performing, by a key value storage device connected to a memory, input and output operations in an input-output region of the memory that is memory mapped to another device;
    reading, by the key value storage device, according to a first key value request issued by the other device, a first value from a key value request queue in the input-output region, the first key value request being based on a configuration by a host device; and
    writing, by the key value storage device, the first value to the input-output region of the memory according to the first key value request.

2. The method of claim 1, further comprising, performing, by the key value storage device, a key lookup, in the key value storage device, to retrieve the first value for the writing of the first value to the input-output region of the memory.

3. The method of claim 1, wherein the first key value request includes a return-value region, the return-value region being a region allocated for the first value.

4. The method of claim 3, wherein the writing of the first value to the input-output region of the memory comprises writing the first value to the return-value region.

5. The method of claim 1, further comprising:
    receiving, by the other device, the configuration from the host device; and
    based on the configuration from the host device, storing, by the other device, key value requests in the input-output region of the memory, and reading, by the other device, values from the input-output region of the memory.

6. The method of claim 1, wherein the other device that is memory mapped to the memory comprises a graphics processing unit configured to write the first key value request to the input-output region of the memory, and to read the first value from the input-output region of the memory.

7. The method of claim 1, wherein the first key value request is read, by the key value storage device, from the key value request queue via peer-to-peer direct memory access.

8. The method of claim 1, wherein the first value is written, by the key value storage device, to the input-output region of the memory via peer-to-peer direct memory access.

9. The method of claim 1, wherein the key value storage device is connected to the other device by a peripheral component interconnect connection.

10. The method of claim 1, wherein the first key value request is written, by the other device, to the key value request queue in the input-output region; and
    wherein the method further comprises writing, by the other device, a second key value request to the key value request queue, after the writing, by the other device, of the first key value request, and before the writing, by the key value storage device, of the first value.

11. A system for machine learning, the system comprising:
- a key value storage device; and
- a memory connected to the key value storage device, the memory being memory mapped to another device connected to the key value storage device by a peripheral component interconnect connection,
- wherein the key value storage device is configured to:
  - perform input and output operations in an input-output region of the memory;
  - read, according to a first key value request issued by the other device, a first value from a key value request queue in the input-output region, the first key value request being based on a configuration by a host device; and
  - write the first value to the input-output region of the memory according to the first key value request.

12. The system of claim 11, wherein the key value storage device is further configured to perform a key lookup, in the key value storage device, to retrieve the first value to write the first value to the input-output region of the memory.

13. The system of claim 11, wherein the first key value request includes a return-value region, the return-value region being a region allocated for the first value.

14. The system of claim 11, wherein the other device comprises a graphics processing unit configured to write the first key value request to the input-output region of the memory, and to read the first value from the input-output region of the memory.

15. The system of claim 11, wherein the key value storage device is configured to read the first key value request from the key value request queue via peer-to-peer direct memory access.

16. The system of claim 11, wherein the key value storage device is configured to write the first value to the input-output region of the memory via peer-to-peer direct memory access.

17. A system for machine learning, the system comprising:
- a graphics processing unit;
- a key value storage device; and
- shared memory for communication between the graphics processing unit and the key value storage device, the shared memory being memory mapped to the graphics processing unit,
- wherein the key value storage device is configured to:
  - perform input and output operations in the shared memory;
  - read, according to a first key value request issued by the graphics processing unit, a first value from a key value request queue in the shared memory, the first key value request being based on a configuration by a host device; and
  - write the first value in the shared memory according to the first key value request.

18. The system of claim 17, wherein the graphics processing unit is configured to write the first key value request to the shared memory, and to read the first value from the shared memory, and
- wherein the graphics processing unit is memory-mapped to the shared memory to perform memory-mapped input and output operations in the shared memory.

19. The system of claim 18, wherein the key value storage device is configured to read the first key value request from the key value request queue via peer-to-peer direct memory access, and
- wherein the key value storage device is configured to write the first value to the shared memory via peer-to-peer direct memory access.

20. The method of claim 1, wherein the first key value request comprises an address exposing the input-output region of the memory that is memory mapped to the other device based on the configuration by the host device.

* * * * *